(12) United States Patent
Ghazisaidi

(10) Patent No.: US 9,379,840 B2
(45) Date of Patent: Jun. 28, 2016

(54) ENERGY EFFICIENT DYNAMIC BANDWIDTH ALLOCATION FOR OPTICAL NETWORKS

(75) Inventor: Navid Ghazisaidi, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 209 days.

(21) Appl. No.: 14/233,281

(22) PCT Filed: Jul. 27, 2011

(86) PCT No.: PCT/IB2011/001740
§ 371 (c)(1),
(2), (4) Date: May 22, 2014

(87) PCT Pub. No.: WO2013/014483
PCT Pub. Date: Jan. 31, 2013

(65) Prior Publication Data
US 2014/0321854 A1    Oct. 30, 2014

(51) Int. Cl.
*H04J 14/02* (2006.01)
*H04Q 11/00* (2006.01)
*H04J 3/16* (2006.01)

(52) U.S. Cl.
CPC ............... *H04J 14/023* (2013.01); *H04J 3/16* (2013.01); *H04J 3/1694* (2013.01); *H04J 14/0221* (2013.01); *H04Q 11/0067* (2013.01); *H04J 2203/0058* (2013.01); *H04Q 2011/0064* (2013.01); *H04Q 2011/0079* (2013.01)

(58) Field of Classification Search
CPC .............................................. H04Q 2011/0064
See application file for complete search history.

(56) References Cited

U.S. PATENT DOCUMENTS

| 2003/0091045 | A1* | 5/2003 | Choi ................ | H04Q 11/0067 370/390 |
| 2007/0147423 | A1* | 6/2007 | Wentink ........... | H04W 52/0216 370/468 |
| 2007/0172236 | A1* | 7/2007 | Nomura ............ | H04Q 11/0067 398/45 |
| 2008/0267630 | A1* | 10/2008 | Qian ................. | H04J 14/0226 398/89 |
| 2009/0190606 | A1* | 7/2009 | Lee .................. | H04Q 11/0067 370/449 |
| 2009/0220226 | A1* | 9/2009 | Hehmann ......... | H04J 3/14 398/25 |
| 2010/0316387 | A1 | 12/2010 | Suvakovic | |

OTHER PUBLICATIONS

Claudio Cicconetti, et al.; "Reducing Power Consumption with QoS Constraints in IEEE 802.16e Wireless Networks"; IEEE Transactionson Mobile Computing, vol. 9, No. 7; Jul. 2010; pp. 1008-1021.

(Continued)

*Primary Examiner* — Nathan Curs
(74) *Attorney, Agent, or Firm* — Patent Portfolio Builders PLLC

(57) ABSTRACT

Device and method for scheduling traffic exchange in a passive optical network, PON, to reduce energy consumption. The method includes a step of instructing an optical network terminal, ONU, and an optical line terminal, OLT, in the PON to maximize an overlap between upstream and downstream communications by exchanging a predetermined future time (t2) at which to start the upstream and downstream communications; a step of sending to the ONU a predetermined time interval (G) during which the ONU need to have a transmitter and a receiver on; and a step of adding a flag (MPSMP) to a control message sent from the OLT to the ONU that is indicative of whether further messages are to be received from the OLT or not.

17 Claims, 8 Drawing Sheets

(56) References Cited

OTHER PUBLICATIONS

Christoph Lange, et al.; "On the Energy Consumption of FTTH Access Networks"; 2009 OSA/OFC/NFOEC; 2009 Optical Society of America; JThA79.pdf; T-Systems Enterprise Services GmbH; Goslarer Ufer 35 10589, Berlin Germany; 2009; pp. 1-3.

G. S. Kim, et al.; "An Adjustable Power Management for Optimal Power Saving in LTE Terminal Baseband Modem"; IEEE; Oct. 13, 2009; pp. 1847-1853.

Yi Zhang, et al.; "Energy Efficiency in Telecom Optical Networks"; IEEE Communications Surveys & Tutorials, vol. 12, No. 4, Fourth Quarter 2010; pp. 441-458.

B. Skubic, et al.; "Evaluation of ONU Power Saving Modes for Gigabit-Capable Passive Optical Networks"; IEEE Network; Mar./Apr. 2011; pp. 20-24.

J. Nieminen; "Energy-Adaptive Scheduling and Queue Management in Wireless LAN Mesh Networks"; Digital Object Identifier 104108/CST.Wicon2010.8521; Wireless Internet Conference (WICON), Mar. 2010 The 5th Annual ICST 2010; E-ISBN 978-963-9799-86-8; pp. 1-9; Singapore.

IEEE Computer Soeciety; "Part 3: Carrier Sense Multiple Access with Collision Detection (CSMA/CD) Access Method and Physical Layer Specifications, Amendment 5: Media Access Control Parameters, Physical Layers, and Management Parameters for Energy-Efficient Ethernet"; IEEE Standard for Information technology—Telecommunications and information exchange between systems—Local and metropolitan area networks—Specific requirements; IEEE Std 802.3az-2010 (Amendment to IEEE Std 802.3 2008); Oct. 27, 2010; pp. 1-302.

R. Y. Kim; "Advanced Power Management Techniques in Next-Generation Wireless Networks"; IEEE Communications Magazine; Topics in Wireless Communications; May 2010; pp. 94-102.

R. Kubo; "Sleep and Adaptive Link Rate Control for Power Saving in 10G-EPON Systems"; IEEE Globecom 2009 proceedings; 978-1-4244-4148-8/09; NTT Access Network Service Syst. Labs., NTT Corp., Yokosuka, Japan 0112010; DOI:10.1109/GLOCOM.2009. 5425689 in proceeding of: Global Telecommunications Conference, 2009. GLOBECOM 2009. IEEE Source: IEEE Xplore Jan. 2010; pp. 1-6.

R. Kubo, et al.; "Study and Demonstration of Sleep and Adaptive Link Rate Control Mechanisms for Energy Efficient 10G-EPON"; J. Opt. Commun. Netw./ vol. 2, No. 9; Optical Society of America; Sep. 2010; pp. 716-729.

International Telecommunication Union; "Series G: Transmission Systems and Media, Digital Systems and Networks, GPON power conservation"; ITU-T Telecommunication Standardization Sector of ITU; Series G, Supplement 45; ITU-T G-series Recommendations—Supplement 45; May 2009; pp. 1-37.

R. Tucker; "Evolution of WDM Optical IP Networks: A Cost and Energy Perspective"; Journal of Lightwave Technology, vol. 27, No. 3; Feb. 1, 2009; pp. 243-252.

Shing-Wa Wong, et al.; "Demonstration of Energy Conserving TDM-PON with Sleep Mode ONU using Fast Clock Recovery Circuit"; IEEE 978-1-55752-884-1/10; OSA/OFC/NFOEC/ OThW7.pdf; 2010; pp. 1-3.

International Preliminary Report on Patentability issued in corresponding International Application No. PCT/IB2011/001740, mailed Feb. 6, 2014.

International Search Report issued in corresponding International application No. PCT/IB2011/001740, date of mailing Nov. 9, 2011.

GPON power conservation; Series G: Transmission Systems and Media, Digital Systems and Networks, Supplement 45 (May 2009), ITU-T Standard, International Telecommunication Union, Geneva, Switzerland, May 15, 2009, pp. 1-46, XP017467108.

Wong, Shing-Wa, et al., "Sleep Mode for Energy Saving PONs: Advantages and Drawbacks," 2009 IEEE GLOBECOM Workshops IEEE, Piscataway, NJ, USA, 2009, 6 pages, XP002662421, ISBN: 978-1-4244-5626-0.

Jing-Rong Hsieh, et al., " Energy-Efficient Multi-Polling Scheme for Wireless LANs," IEEE Transactions on Wireless Communications, IEEE Service Center, Piscataway, NJ, USA, vol. 8, No. 3, Mar. 1, 2009, pp. 1532-1541. XP011253456, ISSN: 1536-1276.

\* cited by examiner

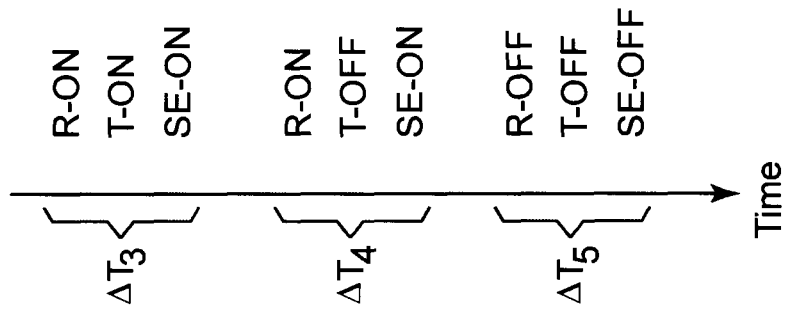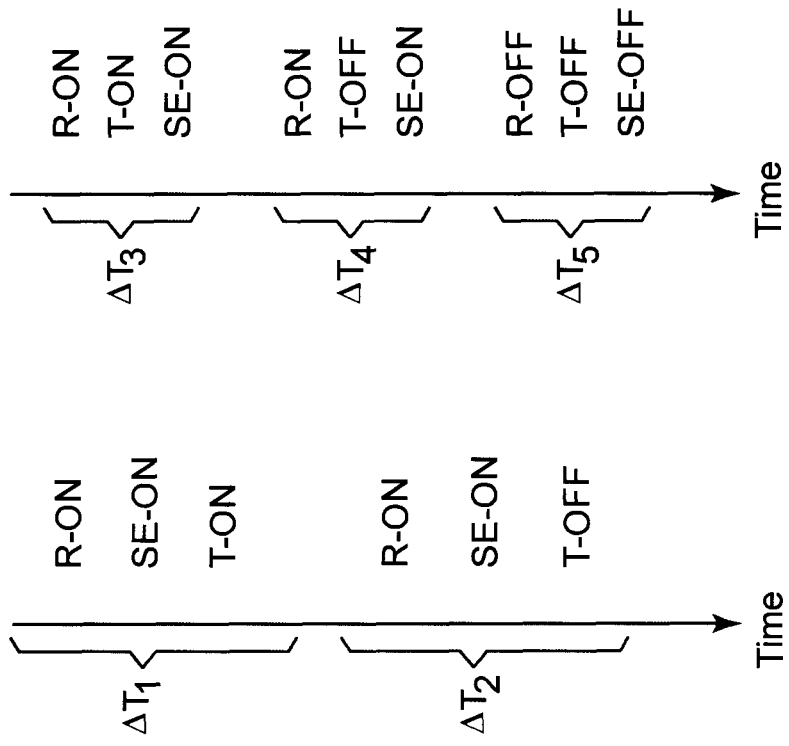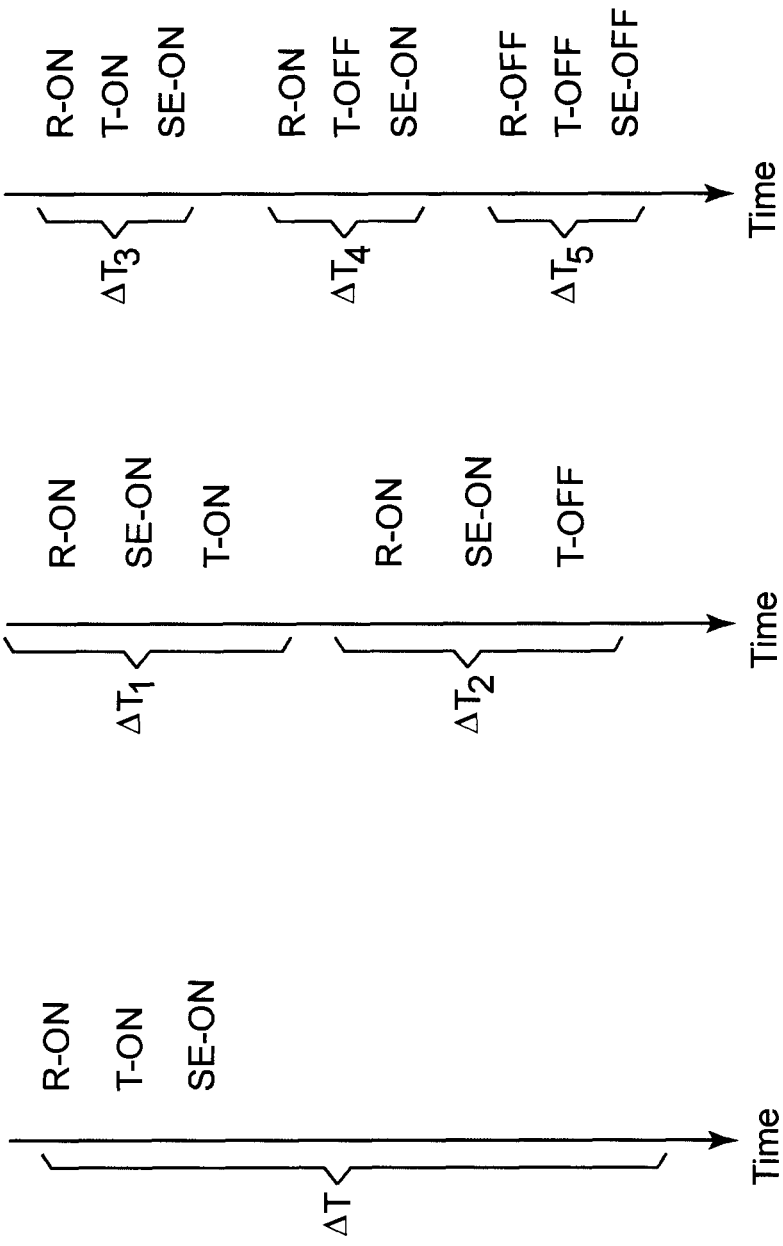

ENERGY EFFICIENT DYNAMIC BANDWIDTH ALLOCATION FOR OPTICAL NETWORKS

TECHNICAL FIELD

The present invention generally relates to systems, software and methods and, more particularly, to mechanisms and techniques for energy efficient dynamic bandwidth allocation in optical networks.

BACKGROUND

During the past years, more and more content users are downloading the desired content into smart phones, tablets, personal computers and even the traditional TV set. Also, the amount of information exchanged between users has dramatically increased. One of the responses of the communication network operators to this increase traffic is to deploy optical fiber instead of the traditional copper wire, which is known to have a larger transmitting capability.

An example of a network that uses optical fiber is a passive optical network (PON). PON is a point-to-multipoint, fiber to the premises network architecture in which unpowered optical splitters are used to enable a single optical fiber to serve multiple premises. A PON 10 is illustrated in FIG. 1 and includes an optical line terminal (OLT) 12, for example, at the service providers central office and a number of optical network units (ONUs) 14 (also known as optical network terminal (ONT)), for example, near end users. A splitter 16 is provided along the optical fiber 18 to split the signal from the OLT for the ONUs. A PON configuration reduces the amount of fiber and central office equipment required compared with point to point architectures. A passive optical network is a form of fiber-optic access network.

A PON takes advantage of using one wavelength for downstream traffic (from OLT to ONU) and another for upstream traffic (from ONU to OLT) on a single fiber. Because of the fact that OLT can continuously transmit information to the ONUs while the ONUs need specific time allocations for transmitting their data, various mechanisms have been implemented for having the ONUs equipment on and off at certain times to accommodate the upstream traffic. For example, such a mechanism is the multi-point control protocol (MPCP) for which in the point-to-multipoint downstream direction, the OLT is able to broadcast data to all ONUs due to the directional property of the optical splitter/combiner and in the upstream direction, as the ONUs cannot communicate directly with one another, each ONU is able to send data only to the OLT in a multipoint-to-point manner. However, these mechanisms are not energy efficient as discussed next.

Many efforts have been devoted to reduce the energy consumption of wired and wireless access networks. PONs have received attention due to their ability of providing the lowest energy consuming solution for broadband access, apart from offering large capacity, small attenuation, low operational expenditures, and longevity. Various results reported in the field (e.g., Tucker et al., "Evolution of WDM Optical IP Networks: A Cost and Energy Perspective," IEEE/OSA Journal of Lightwave Technology, vol. 27, no. 3, pp. 243-252, February 2009) show that PONs consume less energy per bit than hybrid fiber-copper based access technologies, e.g., fiber-to-the-node (FTTN), and wireless access solutions, e.g., WiMAX.

Further, it was shown (e.g., Lange and Gladisch, "On Energy Consumption of Telecommunication Networks-A Network Operator's View," in Proc., OFC/NFOEC, Workshop on Energy Footprint of ICT, San Diego, Calif., USA, March 2009, pp. 1-3) that PONs are also more energy efficient than fiber-to-the-home (FTTH) network technologies such as point-to-point and active optical access networks. This property assures future PON deployments in response to concerns about the green-house impact of the Internet.

With regard to the PON 10 shown in FIG. 1, it is noted that in the point-to-multipoint downstream direction, the OLT is able to broadcast data to all ONUs due to the directional property of the optical splitter/combiner. In the upstream direction, however, ONUs cannot communicate directly with one another. Instead, each ONU is able to send data only to the OLT in a multipoint-to-point manner. To allow all ONUs to share either wavelength without channel collisions, time division multiplexing (TDM) is considered. In both IEEE Ethernet PON (EPON) and ITU-T Gigabit PON (GPON), a polling mechanism is proposed to facilitate bandwidth allocation. More specifically, each ONU reports its required bandwidth (i.e., queue occupancy) to the OLT and the OLT informs the ONUs about their assigned upstream transmission windows in the downstream frame. EPON introduces REPORT and GATE messages in its upstream and downstream directions to report and specify the ONU upstream transmission grants, respectively. In GPON, each upstream and downstream frame contains a dynamic bandwidth report (DBRu) and a physical control block (PCBd). DBRu is used for reporting the required bandwidth by an ONU. PCBd includes a bandwidth map (BWmap) field to specify the ONU upstream transmission grants. Note that various dynamic bandwidth allocation (DBA) algorithms have been proposed in the literature, while no specific DBA algorithm is specified in IEEE EPON and ITU-T GPON standards.

The XG-PON standard introduces the following low-power operation modes: (i) shedding, (ii) sleeping (or known as cyclic sleeping), and (iii) dozing. In ONU power shedding mode, non-essential functions are powered off or reduced. While the transmitter and receiver modules of ONU are powered off in the sleeping mode, the doze mode turns off the transmitter part for substantial periods of time only. The sleeping mode is further subdivided into fast sleep and deep sleep. In the fast sleep mode, the power save state sojourn consists of a sequence of sleep cycles, each composed of a sleep period and an active period. In the deep sleep mode, the transmitter and receiver remain off for the entire duration of the power save state sojourn. The evaluation of the cyclic sleep and doze operation modes show that the cyclic sleep experiences a greater power saving. However, the cyclic sleep results in a reduction of the Quality of Service (QoS) performance for longer sleep intervals. When deploying the doze mode, the power consumption of PON decreases without incurring any QoS penalties.

The IEEE 803.3az energy efficient Ethernet (EEE) standard introduces an overhead for waking up and sleeping the Ethernet link, where the low-power idle mode is defined when there is no packet to transmit. In EEE, packet coalescing, which assembles multiple packets before sending them, can further improve the channel and energy efficiency by reducing the number of wake and sleep time intervals. However, various studies have shown that coalescing increases delay and even causes packet loss in downstream buffers.

Accordingly, it would be desirable to provide devices, systems and methods that are more energy efficient while reducing the negative impact on the QoS.

SUMMARY

Assets as, for example, content are desired to be provided to the users as fast as possible and with minimum energy consumption. An optical passive network is capable of achieving these goals. Due to the particular structure of a PON, i.e., upstream traffic from plural ONUs following partially a same path to the OLT, various protocols are proposed to minimize energy usage while transmitting data. However, the existing protocols have the ONUs either being active when not necessary or being passive (in a sleep mode) when undesirable.

According to one exemplary embodiment, there is a method for scheduling traffic exchange in a passive optical network, PON, to reduce energy consumption. The method includes a step of instructing an optical network unit, ONU, and an optical line terminal, OLT, in the PON to maximize an overlap between upstream and downstream communications by exchanging a predetermined future time (t2) at which to start the upstream and downstream communications; a step of sending to the ONU a predetermined time interval (G) during which the ONU need to have a transmitter and a receiver on; and a step of adding a flag (MPSMP) to a control message sent from the OLT to the ONU that is indicative of whether further messages are to be received from the OLT or not.

According to another exemplary embodiment, there is an optical network unit, ONU, that exchanges traffic with an optical line terminal, OLT, in a passive optical network, PON. ONU includes an optical interface configured to connect to an optical fiber; and a controller that controls a traffic exchange along the optical fiber, between the ONU and OLT. The controller is configured to, maximize an overlap between upstream and downstream communications between the ONU and OLT by receiving a predetermined future time (t2) at which to start the upstream communication, and a predetermined time interval (G) during which the ONU need to have a transmitter and a receiver on, and analyze a control message adding a flag (MPSMP) to a control message sent from the OLT to the ONU that is indicative of whether further messages are to be received from the OLT or not.

According to still another exemplary embodiment, there is an optical line terminal, OLT, connected to plural optical network units, ONUs, in a passive optical network, PON. The OLT is configured to schedule a traffic exchange in the PON to reduce energy consumption. The OLT includes an optical interface configured to connect to an optical cable that communicates with an ONU; and a controller. The controller is configured to instruct the ONU to maximize an overlap between upstream and downstream communications between the OLT and the ONU by sending a predetermined future time (t2) at which to start the upstream and downstream communication; to send to the ONU a predetermined time interval (G) during which the ONU needs to have a transmitter and a receiver on; and to add a flag (MPSMP) to a control message sent from the OLT to the ONU that is indicative of whether further messages are to be received from the OLT or not.

According to yet another exemplary embodiment, there is a computer readable medium including computer executable instructions, wherein the instructions, when executed, implement the above discussed method.

It is an object to overcome some of the deficiencies discussed in the previous section and to provide a PON with a low energy usage and high QoS. One or more of the exemplary embodiments advantageously provides an energy efficient dynamic bandwidth allocation for PONS.

LIST OF ABBREVIATIONS

PON—Passive optical network
FUN—Fiber-to-the-node
FTTH—Fiber-to-the-home
OLT—Optical line terminal
ONU—Optical network unit
TDM—Time division multiplexing
EPON—Ethernet PON
GPON—Gigabit PON
DBRu—Dynamic bandwidth report
PCBd—Physical control block
BWmap—Bandwidth map
DBA—Dynamic bandwidth allocation
QoS—Quality-of-service
EEE—Energy efficient Ethernet
EE-DBA—Energy-efficient DBA
MPSMP—More power save mode packet

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 6a, 6b and 6c schematically illustrate a power consumption over time of a ONU according to a traditional mechanism, power saving doze approach, and also according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a GPON. However, the embodiments to be discussed next are not limited to this protocol but may be applied to other existing protocols, e.g., EPON.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, an energy-efficient DBA (EE-DBA) algorithm is proposed to maximize the power savings of the optical network while improving the QoS performance of the optical network. In one application, the power consumption of the optical network is minimized by allocating the bandwidth and scheduling the data transmission in a way to maximize an overlap between upstream and downstream traffic between a specific ONU and the OLT, respectively. Such an embodiment decreases the QoS penalty of being in the sleep mode (which was observed in the sleeping mode in the existing optical networks). In another application a flag is introduced in the traffic from OLT to ONU to signal the ONU when to switch off its receiver.

More specifically, the OLT is configured to schedule the ONU for its upstream traffic and based on this schedule, the OLT postpones its downstream traffic destined to that ONU for an instance when the ONU is gated and becoming active for transmitting. This technique, as will be discussed later in further details, decreases the total power consumption of ONU without any impact on the QoS support especially for the delay-sensitive traffic.

Figure 1:
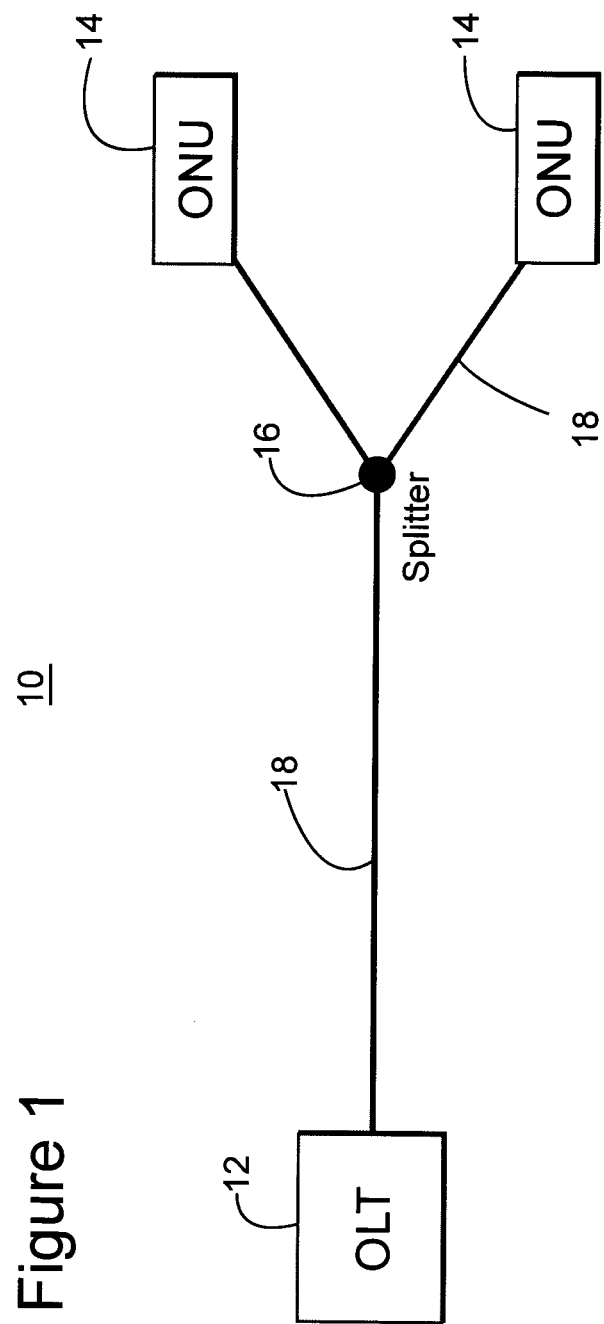
FIG. 1 is a schematic diagram of a PON.
Figure 2:
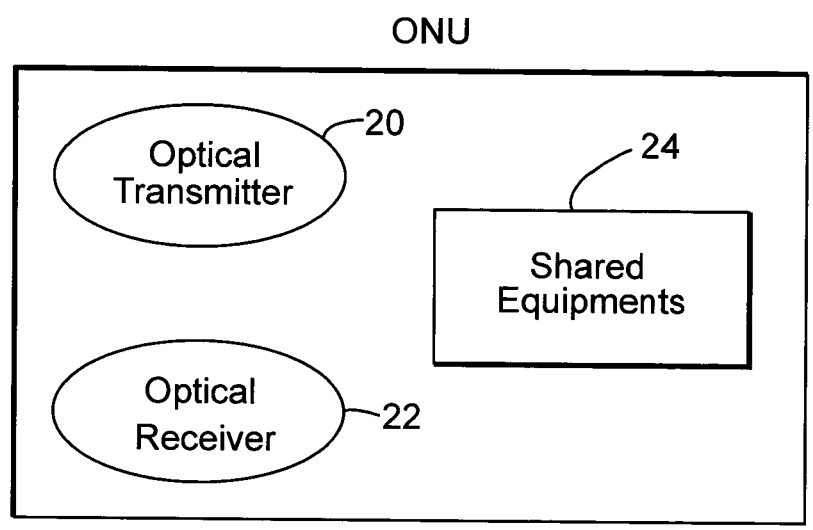
FIG. 2 is a schematic diagram of a ONU.

For a better understanding of some aspects of the invention, FIG. 2 schematically shows three power consuming segments of each ONU 14: (i) a transmitter 20, (ii) a receiver 22, and (iii) shared equipment 24 shared by the transmitter and the receiver. In this figure, the total power consumption of ONU is divided into three segments based on their functionalities. The optical transmitter unit 20 uses power to transmit the upstream traffic and control messages to the OLT. The optical receiver 22 uses power to receive the downstream traffic and control messages coming from the OLT. The shared equipments 24 uses power for both transmitting and receiving operations, such as a memory.

According to one aspect, a novel schedule minimizes the power consumption of the shared equipments of ONU used in both transmitting and receiving operations by maximizing the overlap between upstream and downstream transmissions.

Figure 3:
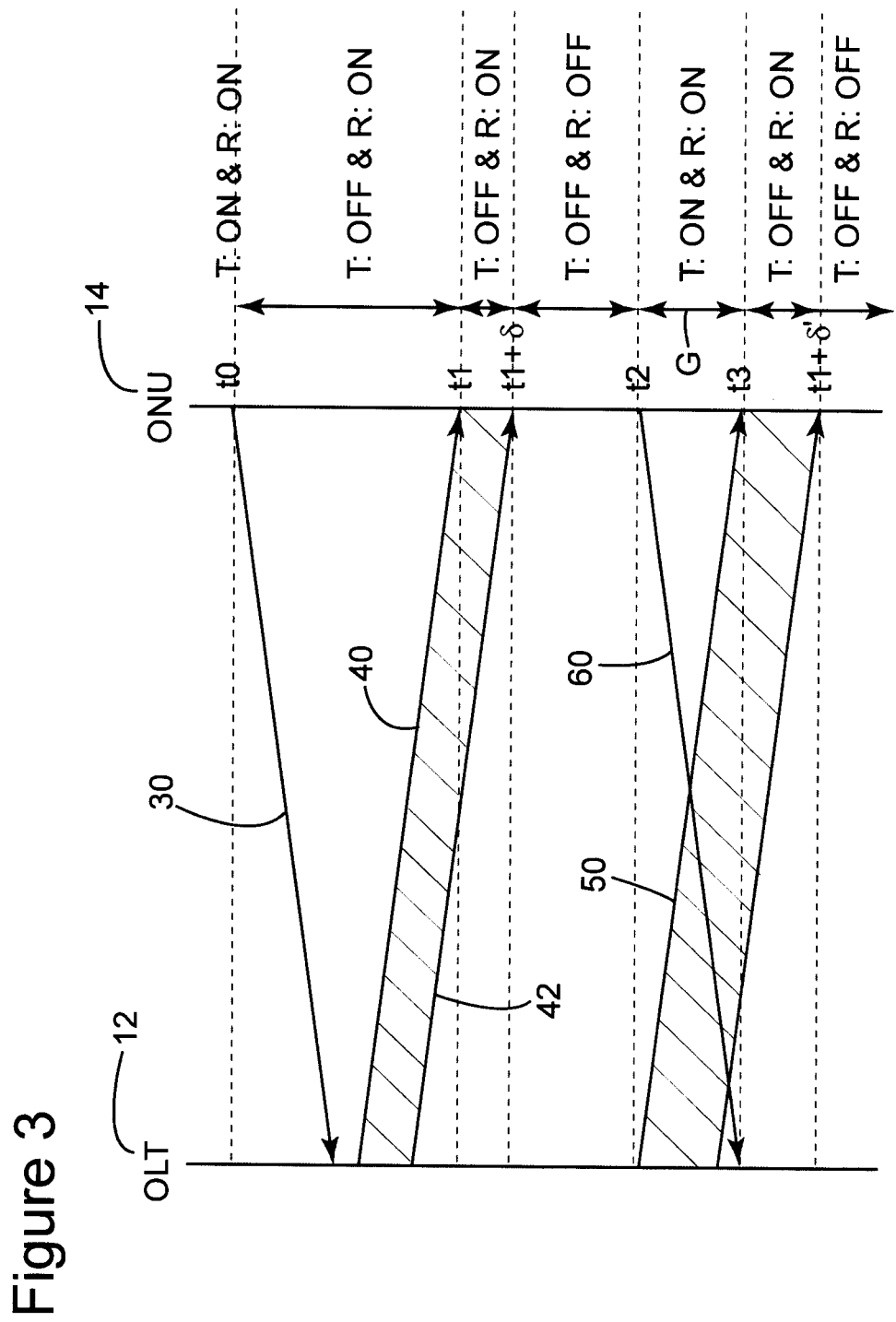
FIG. 3 is a schematic diagram of control messages and traffic data exchanged between OLT and ONU according to an exemplary embodiment.

A novel EE-DBA mechanism is now discussed with reference to FIG. 3. As noted above, the novel mechanism may be implemented in various types of PONs. FIG. 3 is a space-time diagram for the PON that illustrates various messages exchanged between the OLT 12 and one of the ONUs 14. Starting at time t0, it is assumed that the ONU has some packets to transfer to the OLT. Thus, ONU 14 turns on its transmitter 20 and transmits a DBRu message 30 in GPON (or REPORT message in EPON or other dedicated messages in other protocols). The OLT 12 responds with a PCBd message 40 in GPON (or GATE message in EPON or other dedicated messages in other protocols). This message 40 is received by the ONU 14 at time t1. Both messages 30 and 40 are control messages.

Thus, ONU 14 needs to turn ON its receiver 22 and turns OFF its transmitter 20 as soon as it transmits the DBRu message 30. In other words, the transmitter 20 of ONU 14 is OFF between t0 and t1. During this time, the OLT sends the control packet PCBd 40 to the ONU and if there is any downstream traffic destined to the ONU, it sets a More Power Save Mode Packet (MPSMP) flag (attached to the PCBd control message 40) to one and then starts transmitting downstream traffic 42. As soon there is no further downstream traffic in the buffer of OLT, it sends the downstream traffic 42 with MPSMP flag set to zero. In other words, based on this novel mechanism, the OLT knows that the ONU's receiver is ON and the OLT starts transmitting downstream packets destined to the ONU. The OLT applies to the control message 40 and/or the downstream traffic 42 transmitted to the ONU the specific flag MPSMP bit having a value of one to indicate that there is more downstream traffic for the ONU and ONU should keep its receiver ON to receive them. If the MPSMP has a value of zero it indicates to the ONU that no more downstream traffic is to be expected in the current session.

As noted above, if the flag MPSMP was set to one in the transmitted control packet PCBd 40, the OLT sends the downstream traffic destined to the ONU. The downstream traffic 42 is thus sent in the time interval t1 to t1+δ as shown in FIG. 3. During this time interval, the MPSMP bit is one. If there is no more downstream traffic for the ONU, the OLT should set the MPSMP bit to zero in the downstream traffic 42 and the transmission to this specific ONU terminates. When the ONU receives the MPSMP bit zero, it turns the receiver OFF in order to conserves power given the fact that there is no more downstream data coming from the OLT. Thus, at time t1+δ the transmitter, the receiver and the shared equipments 24 are OFF. Meantime, the OLT continues its downstream transmissions to other ONUs.

Regarding the next data exchange with the OLT, the ONU schedules, after receiving the PCBd message 40, its transmitter and receiver to be turned on at time t2 for a period G as specified by the OLT. In other words, the control message 40 provides to the ONU the time t2 at which the next communication takes place and the time period G for which both the receiver and the transmitter of the ONU should be ON for the next data transmission. Based on this information, the OLT, which scheduled the ONU for upstream traffic at time t2, postpones its later incoming packets destined to the ONU for the scheduled time t2.

At t2, both OLT and ONU start transmitting their buffered packets 50 and 60. Thus, at t2, the ONU switches ON both the receiver and transmitter. The receiver and transmitter remain ON for the time period G. In one application, there may be a short delay before transmitting the information either from OLT or from ONU so that the transmission at the OLT and ONU is not quite simultaneously. Similar to the previous step of transmitting the PCBd message 40 to the ONU, the OLT can extend its downstream transmission using the MPSMP flag in its last downstream packet during time period G. If this flag is set to one it means that the OLT has more packets to transmit and the ONU's receiver should stay ON after time t3 (t3=t2+G). However, the ONU's transmitter can be turned OFF at t3. This configuration of ONU, i.e., receiver ON and transmitter OFF, continues for a time δ', i.e., until time t3+δ' when the MPSMP is set to be zero. At this time t3+δ', both the receiver and the transmitter of ONU are turned OFF until the next communication.

In one exemplary embodiment, the OLT determines the time t2 and time interval G based on various factors, e.g., the amount of information that needs to be sent to the ONU or to the OLT, the number of ONUs, or other factors. These parameters (i.e., t2 and G) may be dynamically calculated by the OLT during a process that includes ONU reporting the required bandwidth and OLT indicating the grant of the bandwidth by means of EE-DBA. Further, it is noted that both δ and δ', i.e., the extended downstream transmission periods, are variable and these times depend on the downstream buffer status of the OLT.

Figure 4:
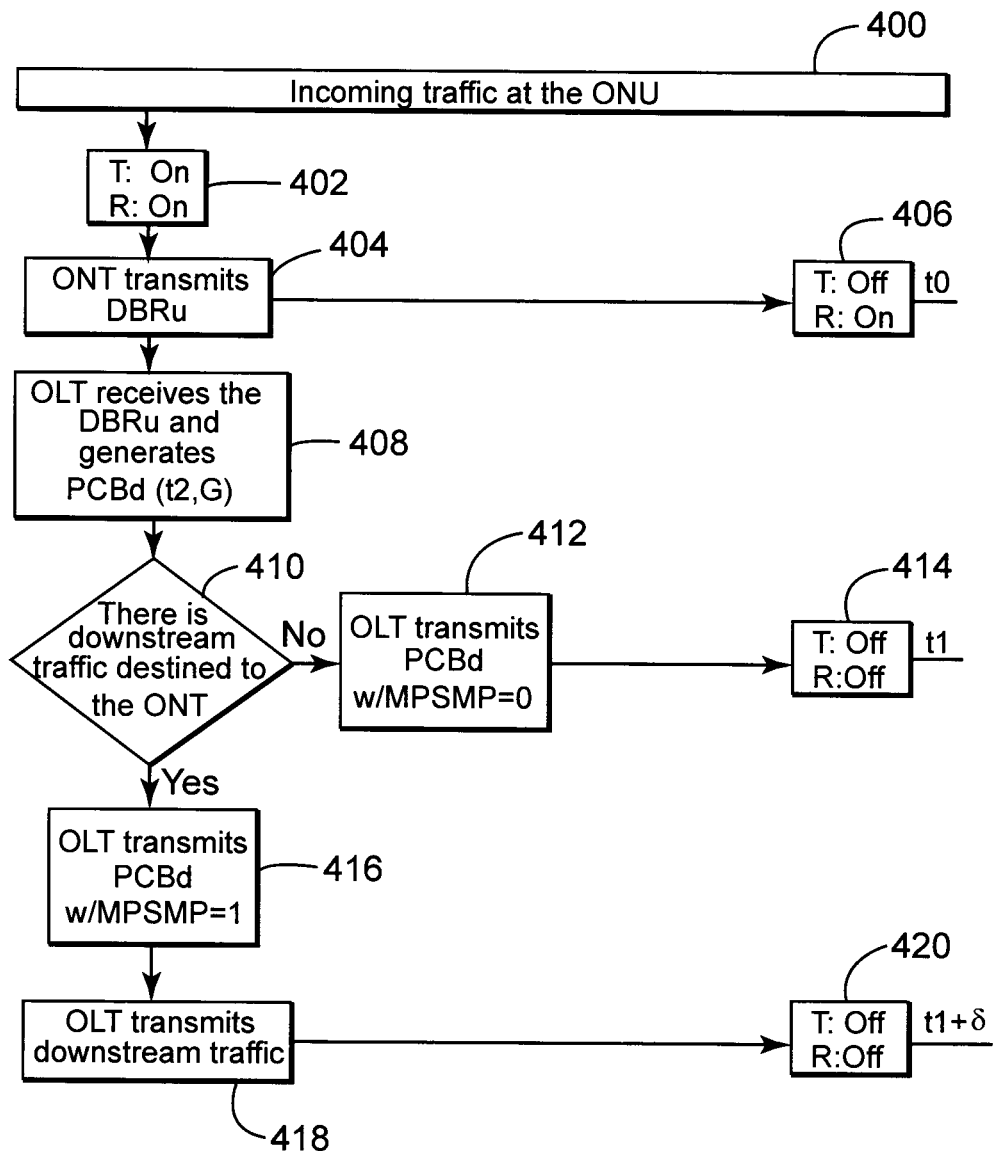
FIG. 4 is a flow chart illustrating a mechanism for exchanging control messages between OLT and ONU according to an exemplary embodiment.
Figure 5:
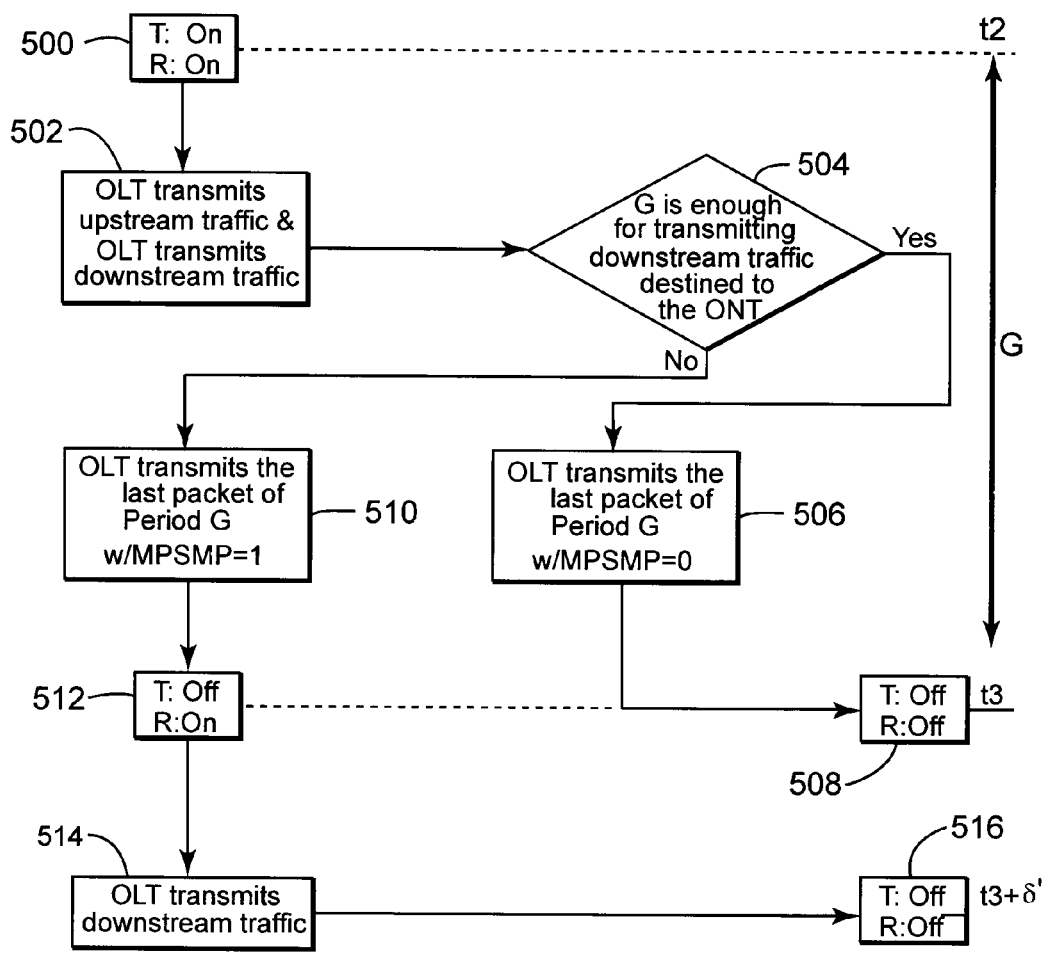
FIG. 5 is a flow chart illustrating a mechanism for exchanging traffic data between OLT and ONU according to an exemplary embodiment.

For a better illustration of the exchanged control messages 30 and 40 and also of the traffic data (downstream and upstream) 50 and 60 exchanged between the OLT and ONU according to the novel features discussed above, FIG. 4 details the exchange of control messages while FIG. 5 details the exchange of traffic data. Control messages are generally regarded as information related to a certain process, method, algorithm while traffic data is generally regarded as information related to content, i.e., movies, email, documents, songs, etc. However, the traffic data may also include control messages or control bits, e.g., MPSMP.

FIG. 4 illustrates the exchange of control messages 30 and 40 shown in FIG. 3 and also the actions taken by the ONU at various times. Thus, the times shown in FIG. 4 correspond to the times shown in FIG. 3. In step 400 traffic is incoming at the ONU 14. Thus, the receiver and transceiver of the ONU 14 are turned ON in step 402. In step 404, the ONU sends the DBRu control message 30 to the OLT and also turns OFF in step 406 the transmitter and maintains ON the receiver. This step takes place at time t0. In step 408, the OLT receives the control message 30 and calculates time t2, a future time at which the upstream and downstream traffic between the OLT and ONU should be performed, and also a time period G, the amount of time for which the ONU should have its receiver and transmitter ON for sending the upstream traffic. The time period G is assigned by the OLT based on the required upstream bandwidth requested by ONU, which was indicated in the DBRu control packet transmitted by ONU to OLT. In this step the PCBd control message 40 is generated to include t2 and G.

In step 410, the OLT, for example, a controller to be discussed later, determines whether there is downstream traffic to be sent to the ONU. If the result of this determination is negative, in step 412 the OLT transmits the control message 40 to the ONU. The control message 40 has the MPSMP flag set to zero for this scenario. When receiving this control message at t1, the ONU instructs in step 414 both the receiver and the transmitter to turn OFF as no further communication is expected from the OLT until time t2. This determination is made by a controller (not shown) of the ONU to be discussed later.

However, if the result of the determination made in step 410 is positive, i.e., there is more downstream traffic to be sent to ONU, the OLT transmits the control message 40 with the MPSMP flag set to one to make the ONU aware that further traffic is to come and not to turn its receiver OFF. In step 416 the OLT transmits this downstream traffic with the MPSMP flag set to one until at a time t1+δ when the last downstream traffic is sent in step 418 with MPSMP flag set to zero. At this time t1+δ the ONU instructs its receiver to turn OFF to save power as no further communication is expected until t2.

Thus, it is noted that the control message exchange part is flexible, i.e., has a variable duration (δ) depending on the needs of OLT and the QoS is not affected while power consumption is minimized at the ONU.

Moving to the upstream and downstream traffic exchange, FIG. 5 illustrates the steps involved for this part of the mechanism. In step 500, which takes place at the pre-established time 2, the ONU turns its transmitter and receiver ON. Then, in step 502, the ONU transmits upstream traffic (data traffic) to the OLT and OLT transmits downstream traffic to ONU. The exchange of this traffic is simultaneous which saves power at the ONU for the following reason.

Consider the traditional approach, illustrated in FIG. 6a, in which the transmitter, receiver and the shared equipment SE are ON when 1) transmitting, 2) receiving, 3) both transmitting and receiving, and 4) no transmitting and no receiving. In other words, during a time interval Δt, all components of ONU are ON.

Consider the power saving doze approach, illustrated in FIG. 6b, in which the receiver and shared equipment SE are always ON, while the transmitter is ON for ONU transmissions (i.e., during a time period Δt2). In other words, the transmitter and receiver are simultaneously ON during a time period Δt1, the transmitter OFF and the receiver ON during the time period Δt2, where the time periods Δt1 and Δt2 may add to Δt.

However, this is not the case for the novel approach, which is illustrated in FIG. 6c, in which the transmitter and receiver are simultaneously ON during a time period Δt3, the transmitter OFF and the receiver ON during a time period Δt4 and all equipment OFF during a time period Δt5, where the time periods Δt3, Δt4, and Δt5 may add to Δt. In other words, due to the novel mechanism described above, the transmitter 20, the receiver 22, and the shared equipment 24 of FIG. 2 are used more judiciously and for less time comparative to the traditional approach or the power saving doze approach, which is conducive to power savings.

Returning to FIG. 5, in step 504, the controller of the OLT makes the determination of whether the previously transmitted time period G is enough for transmitting the downstream traffic destined to the ONU. If the result of this determination is positive, the OLT transmits in step 506 the last packet of period G with the MPSMP flag set to zero and the ONU turns in step 508 at time t3 (i.e., t2+G) both the receiver and transmitter OFF.

However, if the determination in step 504 is negative, in step 510 the OLT transmits the last packet of the time period G with the MPSMP set to one. Based on this flag, the ONU knows to keep the receiver ON in step 512 and turns the transmitter OFF. The OLT transmits in step 514 the remaining downstream traffic until a time t3+δ', when ONU turns the receiver OFF in step 516.

Figure 7:
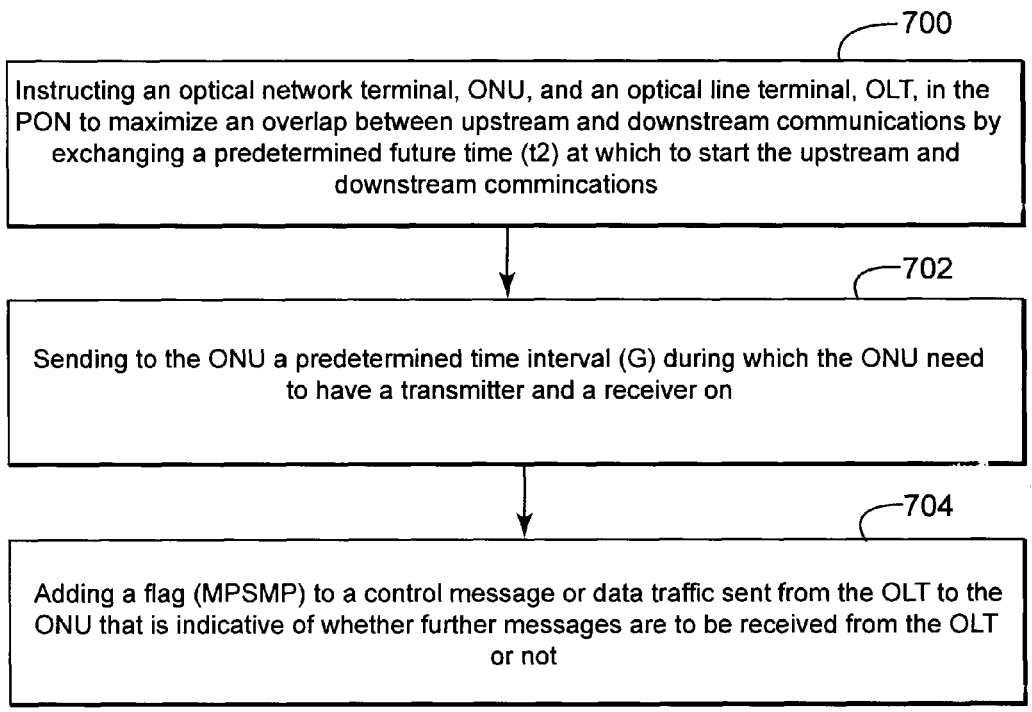
FIG. 7 is a flow chart of a method for scheduling data exchanges between OLT and ONU according to an exemplary embodiment.

The mechanism discussed above may be implemented in a control device according to a method to be discussed next. According to an exemplary embodiment illustrated in FIG. 7, there is a method for scheduling traffic exchange it a passive optical network, PON, to reduce energy consumption. The method includes a step 700 of instructing ONU and OLT to maximize an overlap between upstream and downstream communications by exchanging a predetermined future time (t2) at which to start the upstream and downstream communications; a step 702 of sending to the ONU a predetermined time interval (G) during which the ONU need to have a transmitter and a receiver on; and a step 704 of adding a flag (MPSMP) to a control message and/or data traffic sent from the OLT to the ONU that is indicative of whether further messages are to be received from the OLT or not.

Some advantages of one or more of the exemplary embodiments discussed above are now reviewed. The mechanisms discussed above use less power when compared with systems that use a dozing mode. Also, these novel mechanisms achieve a higher QoS level when compared with traditional mechanisms that employ a sleeping mode as the QoS level of the network decreases for a long cyclic sleep mode ONU. On the other hand, the doze mode avoids any QoS penalties by keeping its receiver ON. However, such a mechanism increases the power consumption in comparison with the sleep mode. The proposed new mechanism avoids the power consumption by keeping ON the ONU's receiver and reduces the QoS penalty of the sleep mode by introducing a new 1-bit flag used by the OLT in both control packet and downstream data transmissions. The introduction of this flag decreases the delay of downstream traffic by means of an advanced and intelligent DBA algorithm to schedule the ONUs.

According to another exemplary embodiment, a power consumption decrease is achieved by overlapping the upstream and downstream transmissions. In other words, one or more exemplary embodiments schedules ONU and its downstream traffic in a way to minimize power consumption of ONU's shared equipments which are used in both upstream and downstream transmissions. As shown, the OLT postpones its downstream traffic received between the control message transmissions and ONU's gated time to the scheduled period to maximize the overlap between downstream and upstream transmissions which decreases the total power consumption of ONU. Note that in the doze mode, the OLT transfers its downstream traffic as soon as it receives them in its buffer.

Figure 8:
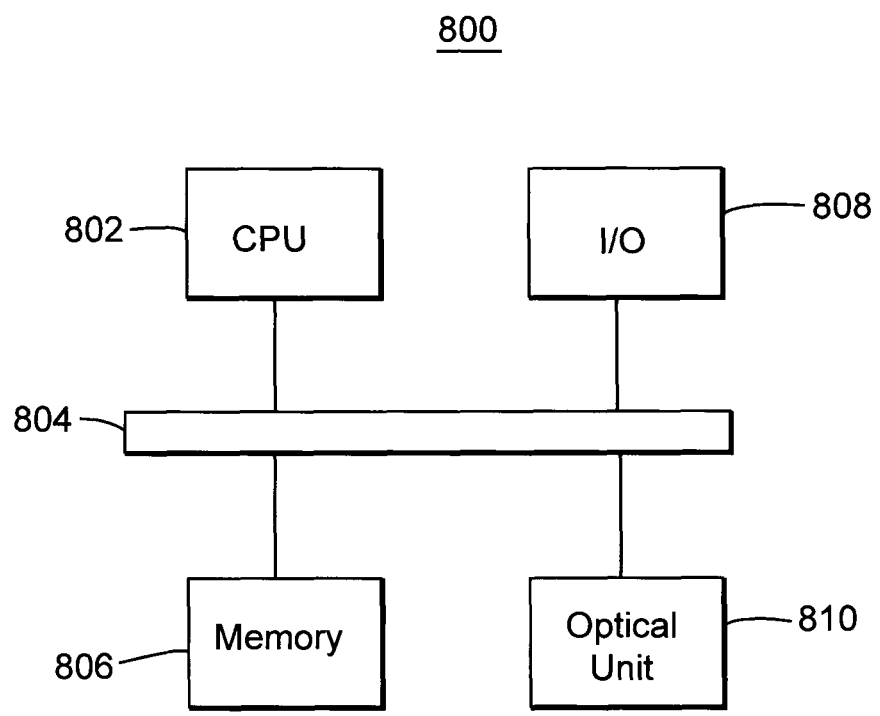
FIG. 8 is a schematic diagram of a control system that may be implemented in the OLT and/or ONU according to an exemplary embodiment.

For purposes of illustration and not of limitation, an example of a representative control device that may be present in either the OLT or the ONU is discussed with reference to FIG. 8. It should be recognized, however, that the principles of the present exemplary embodiments are equally applicable to other systems. FIG. 8 shows a controller 800 that may be implemented in the OLT and/or ONU. Such a controller may include a processor 802 that is connected to a bus 804. A memory 806 may be used to store various instructions for the processor 802, for example, how to calculate t2 and G. An input/output unit 808 may also be connected to bus 804 and this unit offers to a user the possibility to interact with the controller 800, for example, program it. An optional optical unit 810 may also be connected to the bus 804 and allows data communication with the processor 802 via the PON. Other components may be included in the controller as would be recognized by one skilled in the art.

The disclosed exemplary embodiments provide a controller, PON, and a method for scheduling traffic exchange in a passive optical network to reduce energy consumption. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for scheduling traffic exchange in a passive optical network, PON, to reduce energy consumption, the method comprising:
transmitting a first control message from an optical network unit, ONU, to an optical line terminal, OLT, when the ONU has at least one packet to transfer to the OLT, wherein the OLT is connected to plural ONUs;
receiving at the ONU a second control message from the OLT instructing the ONU to maximize an overlap between upstream and downstream communications between the ONU and the OLT, wherein the second control message includes a predetermined future time at which to start the upstream communication, a predetermined time interval during which the ONU needs to have a transmitter and a receiver on, and a flag indicative of whether further messages are to be received from the OLT or not; and
turning on the transmitter and the receiver of the ONU at the predetermined future time,
wherein the transmitter and the receiver of the ONU are both turned off between the receiving of the second control message and the predetermined time to reduce the energy consumption.

2. The method of claim 1, further comprising:
turning off the receiver of the ONU if the flag indicates that no further messages are to be received from the OLT.

3. The method of claim 2, further comprising:
turning off the transmitter of the ONU after the first control message was sent to the OLT.

4. The method of claim 3, further comprising:
extracting from the second control message the predetermined future time at which the transmitter and the receiver of the ONU need to be turned on and also the predetermined amount of time for which the transmitter and receiver need to stay on after being turned on.

5. The method of claim 4, further comprising:
substantially simultaneously sending at the predetermined future time traffic data from the OLT to the ONU and traffic data from the ONU to the OLT.

6. The method of claim 5, further comprising:
turning off the transmitter of the ONU after the predetermined time interval; and
maintaining on the receiver of the ONU if a flag received with the traffic data from the OLT indicates that future data traffic is expected from the OLT.

7. The method of claim 6, further comprising:
turning off the receiver of the ONU when the flag received in the traffic data from the OLT indicates that no future communication is expected from the OLT.

8. An optical network unit, ONU, that exchanges traffic with an optical line terminal, OLT, in a passive optical network, PON, the ONU comprising:
an optical interface configured to connect to an optical fiber;
a transmitter configured to transmit data to the OLT;
a receiver configured to receive data from the OLT; and
a controller that controls a traffic exchange along the optical fiber, between the ONU and OLT, the controller being configured to,
instruct the transmitter to transmit a first control message to the OLT when the ONU has at least one packet to transfer to the OLT,
receive a second control message from the OLT instructing the ONU to maximize an overlap between upstream and downstream communications between the ONU and OLT, wherein the second control message includes a predetermined future time at which to start the upstream communication, a predetermined time interval during which the ONU need to have a transmitter and a receiver on, and a flag indicative of whether further messages are to be received from the OLT or not, analyze the flag in the second control message sent from the OLT to the ONU, and turn on the transmitter and the receiver of the ONU at the predetermined future time, wherein the controller turns off the transmitter and the receiver of the ONU between the receiving of the second control message and the predetermined time to reduce the energy consumption.

9. The ONU of claim 8, wherein the controller is further configured to:

turn off the receiver of the ONU if the flag indicates that no further messages are to be received from the OLT.

10. The ONU of claim 9, wherein the controller is further configured to:

turn off the transmitter of the ONU after the first control message was sent to the OLT, and extract from the second control message the predetermined future time at which the transmitter and the receiver of the ONU need to be turned on and also the predetermined amount of time for which the transmitter and receiver need to stay on after being turned on.

11. The ONU of claim 10, wherein the controller is further configured to:

instruct the transmitter to send at the predetermined future time traffic data to the ONU as the OLT sends data to the receiver.

12. The ONU of claim 11, wherein the controller is further configured to:

turn off the transmitter after the predetermined time interval; and maintain on the receiver if a flag received with the traffic data from the OLT indicates that future data traffic is expected from the OLT.

13. The ONU of claim 12, wherein the controller is further configured to:

turn off the receiver when the flag received in the traffic data from the OLT indicates that no future communication is expected from the OLT.

14. An optical line terminal, OLT, connected to plural optical network units, ONUs, in a passive optical network, PON, wherein the OLT is configured to schedule a traffic exchange in the PON to reduce energy consumption, the OLT comprising:

an optical interface configured to connect to an optical cable that communicates with an ONU; and a controller configured to, receive a first control message from the ONU when the ONU has at least one packet to transfer to the OLT;

reply with a second control message instructing the ONU to maximize an overlap between upstream and downstream communications between the OLT and the ONU, wherein the second control message includes a predetermined future time at which to start the upstream and downstream communications, a predetermined time interval during which the ONU needs to have a transmitter and a receiver on, and a flag indicative of whether further messages are to be received from the OLT or not.

15. The OLT of claim 14, wherein the controller is further configured to:

send traffic data to the ONU at the predetermined future time; and listen for traffic data from the ONU at the predetermined future time.

16. The OLT of claim 15, wherein the controller is further configured to:

determine the predetermined future time; and determine the predetermined time interval.

17. A method for scheduling traffic exchange in a passive optical network, PON, to reduce energy consumption, the method comprising:

receiving, by an optical line terminal, OLT, from an optical network unit, ONU, a first control message indicating that the ONU has at least one packet to transfer to the OLT;

replying, by the OLT to the ONU, with a second control message instructing the ONU to maximize an overlap between upstream and downstream communications between the OLT and the ONU, wherein the second control message includes a predetermined future time at which to start the upstream and downstream communication, a predetermined time interval during which the ONU needs to have a transmitter and a receiver on, and a flag indicative of whether further messages are to be received from the OLT or not.

* * * * *